United States Patent
Claassen et al.

(10) Patent No.: US 8,623,952 B2
(45) Date of Patent: Jan. 7, 2014

(54) METHOD FOR PREPARING A LATEX FROM A CHLORINATED VINYLIC POLYMER

(75) Inventors: Peter Claassen, Zevenaar (NL); Roland Offner, Tavaux (FR); Benoît Faye, Brussels (BE); Yves Vanderveken, Heverlee (BE)

(73) Assignee: SOLVAY (Societe Anonyme), Brussels (BE)

( * ) Notice: Subject to any disclaimer, the term of this patent is extended or adjusted under 35 U.S.C. 154(b) by 1143 days.

(21) Appl. No.: 12/305,410

(22) PCT Filed: Jul. 2, 2007

(86) PCT No.: PCT/EP2007/056626
§ 371 (c)(1),
(2), (4) Date: Dec. 18, 2008

(87) PCT Pub. No.: WO2008/003669
PCT Pub. Date: Jan. 10, 2008

(65) Prior Publication Data
US 2009/0203827 A1    Aug. 13, 2009

(30) Foreign Application Priority Data
Jul. 5, 2006    (FR) ..................................... 06 06166

(51) Int. Cl.
*C08F 20/18*    (2006.01)
*C08F 2/24*     (2006.01)
*C08F 2/18*     (2006.01)
*C08F 214/08*   (2006.01)

(52) U.S. Cl.
USPC ........ 524/458; 526/343; 526/344.2; 526/345; 526/344

(58) Field of Classification Search
USPC ........ 524/461, 458; 526/343, 344, 344.2, 345
See application file for complete search history.

(56) References Cited

U.S. PATENT DOCUMENTS

| | | |
|---|---|---|
| 3,424,706 A | 1/1969 | Smith et al. |
| 4,046,730 A | 9/1977 | Tortai |
| 4,965,130 A * | 10/1990 | Min et al. .................. 428/407 |
| 5,300,551 A | 4/1994 | Candries et al. |
| 5,344,867 A | 9/1994 | Morgan et al. |
| 5,952,165 A | 9/1999 | Anderson et al. |
| 6,383,652 B1 | 5/2002 | Templeton et al. |
| 2005/0176865 A1 | 8/2005 | Wulff et al. |

FOREIGN PATENT DOCUMENTS

| | | |
|---|---|---|
| EP | 25561 A1 | 3/1981 |
| EP | 476743 A1 | 3/1992 |
| FR | 1466220 A | 1/1967 |
| FR | 2286152 A1 | 4/1976 |
| GB | 989911 A | 4/1965 |
| GB | 2254329 A | 10/1992 |
| JP | 54103497 A | 8/1979 |
| JP | 54103498 A | 8/1979 |
| WO | WO 9911673 A1 | 3/1999 |
| WO | WO 0047633 A2 | 8/2000 |
| WO | WO 03055919 A1 | 7/2003 |

OTHER PUBLICATIONS

PCT International Search Report dated Jan. 25, 2008 for International Application PCT/EP2007/056626 (3 pp.).
PCT International Preliminary Report dated Jan. 20, 2009 including the Written Opinion by ISA for International Application PCT/EP2007/056626 (9 pp.)—English translation attached.
Brown R.F.G. and Carr C., "Preparation of concentrated monodisperse latex dispersions of predetermined particle size", Surface Coatings International, Part B : Coatings Transactions 2001, 84(B4), p. 293-300.
Amalvy J.I. "Semicontinuous emulsion polymerization of methyl methacrylate, ethyl acrylate, and methacrylic acid", Journal of Applied Polymer Science, 1996, 59(2), p. 339-344.

* cited by examiner

*Primary Examiner* — Kelechi Egwim
(74) *Attorney, Agent, or Firm* — Oblon, Spivak, McClelland, Maier & Neustadt, L.L.P.

(57) ABSTRACT

Process for preparing a seed latex of a methyl methacrylate polymer (PMMA) by radical polymerization in aqueous emulsion of methyl methacrylate and optionally at least one comonomer.
Process for preparing a chlorinated vinyl polymer latex by radical polymerization in aqueous emulsion of at least one chlorinated vinyl monomer, according to which the polymerization takes place in the presence of at most 3% by weight, expressed relative to the total weight of the monomers, of the PMMA seed latex.

10 Claims, No Drawings

METHOD FOR PREPARING A LATEX FROM A CHLORINATED VINYLIC POLYMER

CROSS-REFERENCE TO RELATED APPLICATIONS

The present application is a U.S. national stage application under 35 U.S.C. §371 of International Application No. PCT/EP2007/056626 filed Jul. 2, 2007, which claims priority benefit to French patent application FR 06.06166 filed on Jul. 5, 2006, these applications being herein incorporated by reference in their entirety for all purposes.

The present invention relates to a process for preparing a seed latex of a methyl methacrylate polymer (PMMA), a PMMA seed latex, the preparation of a chlorinated vinyl polymer latex, in particular a vinylidene chloride polymer (PVDC) latex, by emulsion polymerization seeded by means of this seed and a chlorinated vinyl polymer latex.

The use of a PMMA seed latex for radical polymerization in aqueous emulsion of vinylidene chloride (VDC) has long been known.

Thus, Patent FR 1 466 220 describes the polymerization of VDC in aqueous emulsion in the presence of 3.63% or 3.44% by weight, expressed relative to the total weight of the monomers, of a PMMA seed latex prepared by polymerization in aqueous emulsion (Examples 4 and 5) in the absence of an emulsifier or in the presence of a very small amount (1% by weight relative to the monomers) of this emulsifier introduced at the start of the reaction, resulting in a latex of which the polymer particles are characterized by a diameter of 100 to 120 nm.

However, the Applicant has observed that it may be disadvantageous for the properties of the chlorinated vinyl polymer, in particular of the PVDC and those of films produced with this, to carry out the polymerization of the VDC in the presence of a large amount of a PMMA seed latex and/or a PMMA seed latex of which the particles are characterized by too large a diameter. Therefore, there remains a need to develop a PMMA seed latex which is like the latices of a chlorinated vinyl polymer, in particular of a PVDC, prepared by polymerization seeded using this and the films prepared from these latices are characterized by improved-properties.

The synthesis of a PMMA seed latex used for the polymerization of monomers other than chlorinated vinyl monomers, in particular other than VDC, is disclosed in other documents. In particular, R. F. G. Brown and C. Carr describe, in the article entitled "Preparation of concentrated monodisperse latex dispersions of predetermined particle size" whose reference is Surface Coatings International, Part B: Coatings Transactions, 84 (B4), 293-300, 2001 (CAS 137: 6454), the preparation of a PMMA seed latex requiring small total amounts of emulsifier (from 0.1 to 0.2% by weight relative to the monomers) introduced either at the start or at a later time, resulting in production of a seed latex of which the particles are characterized by a minimum average diameter of 73 nm. These seed latices are then used for the polymerization of (meth)acrylic monomers.

Patent Application JP-A-54103498 describes the synthesis of a PMMA seed according to an in situ process in the polymerization reactor where it is used, without first being isolated, for the subsequent polymerization of (meth)acrylic monomers and the production of ultrafine latices (5 to 50 nm). This process of "in situ" manufacture of the PMMA seed nevertheless has various disadvantages. Thus, it is characterized by a large variability in the reaction kinetics and in the size of the seed particles. Moreover, it does not allow automation of the seed supply to the polymerization reactor, it lacks reproducibility (lack of precision in the amounts of seed latex actually used in the polymerization) and productivity (necessity of preceding each polymerization cycle by the "in situ" synthesis of the seed).

Finally, Patent Application JP-A-54103497 describes the synthesis of an ultrafine PMMA latex (5-50 nm) according to which the total amount of emulsifier introduced into the polymerization does not exceed 3% by weight relative to the total weight of the monomer. This document does not, moreover, indicate anywhere that the latices obtained are seed latices which may be used as a base for manufacturing at least one other latex.

One subject of the present invention is therefore a process for preparing a PMMA seed latex and a process for preparing a chlorinated vinyl polymer latex, in particular a PVDC latex, by means of this seed which do not have the disadvantages of the processes of the prior art, while retaining their advantages.

Firstly, one subject of the present invention is a process for preparing a PMMA seed latex by radical polymerization in aqueous emulsion of methyl methacrylate (MMA) and optionally at least one comonomer, characterized in that the following are used:

(A) MMA and optionally at least one comonomer;
(B) at least one radical generator;
(C) at least one emulsifier in a total amount of at least 4% by weight relative to the total weight of (A); and
(D) water, which comprises the steps according to which:

(1) at least one fraction of (B), at least 2.5% by weight of (C) relative to the total weight of (A), at least one fraction of (D) and optionally at least one fraction of (A) are introduced into a reactor; then
(2) the contents of the reactor are reacted, while continuously introducing thereinto the balance of (A), (B), (C) and (D); and
(3) a PMMA seed latex is obtained and isolated.

The expression "radical polymerization in aqueous emulsion" is understood to mean any radical polymerization process performed in aqueous medium in the presence of at least one emulsifier by way of surfactants and at least one radical generator. This definition specifically encompasses the so-called "conventional" polymerization in aqueous emulsion in which water-soluble radical generators are used, and also polymerization in microsuspension, also called polymerization in homogenized aqueous dispersion, in which oil-soluble radical generators are used and an emulsion of monomer droplets is prepared by virtue of a powerful mechanical stirring and the presence of emulsifiers.

The invention is particularly suitable for the so-called "conventional" polymerization in aqueous emulsion which is carried out under the conditions known to a person skilled in the art. It is in this way that the polymerization is carried out with the intervention of emulsifiers and water-soluble radical generators, present in amounts known to a person skilled in the art.

The term "a polymer latex" is understood to denote an aqueous dispersion of the polymer in water obtained after radical polymerization in aqueous emulsion.

The term "seed latex" is understood to denote a latex whose characteristics are such that it may be used as a base for manufacturing at least one other latex. In particular, it is advantageously characterized by the fact that it absorbs the organic phase well and that it prevents the formation of parasite particle populations.

The PMMA seed latex is advantageously characterized by a solids concentration of around at least 25 wt %, preferably at least 30 wt %. The PMMA seed latex is advantageously characterized by a solids concentration of around at most 40 wt %, preferably at most 35 wt %.

The expression "methyl methacrylate polymers or PMMA" is understood to denote both the homopolymers of methyl methacrylate (MMA) and the copolymers that it forms as the main monomer with at least one comonomer with which it is copolymerizable.

The expression "main monomer" for MMA polymers is understood to denote the monomer present in an amount of at least 100/n wt % of the monomer blend and which will create at least 100/n wt % of the monomer units of the polymer obtained, n denoting the number of monomers of the monomer blend.

Among the comonomers that are copolymerizable with MMA, mention may be made, non-limitingly, of acrylic acids, esters and amides, methacrylic acids, esters and amides, acrylonitrile and methacrylonitrile.

Particularly preferred MMA copolymers are those containing MMA in an amount of at least 100/n wt % and, as copolymerizable monomers, vinyl chloride, vinylidene chloride and/or (meth)acrylic monomers corresponding to the general formula:

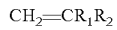

$$CH_2 = CR_1R_2$$

in which $R_1$ is chosen from hydrogen and the methyl radical and $R_2$ is chosen from the —CN radical and the —CO—$R_3$ radical in which $R_3$ is chosen from the —OH radical, the —O—$R_4$ radicals with $R_4$ chosen from the linear or branched alkyl radicals containing from 2 to 18 carbon atoms optionally bearing one or more —OH radicals, the epoxyalkyl radicals containing from 2 to 10 carbon atoms and the alkoxyalkyl radicals containing a total of 2 to 10 carbon atoms and finally $R_3$ is also chosen from the —$NR_5R_6$ radicals in which $R_5$ and $R_6$, which are the same or different, are chosen from hydrogen and the alkyl radicals containing from 1 to 10 carbon atoms, optionally bearing one or more —OH radicals.

More particularly preferred MMA copolymers are those containing, as copolymerizable monomers, vinyl chloride, vinylidene chloride and/or (meth)acrylic monomers that are methyl acrylate, ethyl acrylate, ethyl methacrylate, n-butyl acrylate, n-butyl methacrylate, 2-ethylhexyl acrylate, 2-ethylhexyl methacrylate, 2-hydroxyethyl acrylate, 2-hydroxyethyl methacrylate, glycidyl methacrylate, glycidyl acrylate, acrylonitrile, methacrylonitrile, acrylic acid, methacrylic acid, acrylamide and N-methylolacrylamide.

According to the process according to the invention, a methyl methacrylate comonomer is preferably not used. The process is therefore preferably such that (A) methyl methacrylate is used. The PMMA seed latex is therefore preferably a seed latex of an MMA homopolymer.

According to step (1) of the process for preparing a PMMA seed latex, optionally at least one fraction of (A) is introduced into a reactor.

When at least one fraction of (A) is introduced in step (1), preferably at least 1%, particularly preferably at least 2.5%, more particularly preferably at least 5% and most particularly preferably at least 8% of all, by weight, of (A) are introduced in step (1).

When at least one fraction of (A) is introduced in step (1), preferably at most 30%, particularly preferably at most 25%, more particularly preferably at most 20% and most particularly preferably at most 15% of all, by weight, of (A) are introduced in step (1).

Good results have been obtained without introducing a fraction of (A) in step (1), but by introducing all of (A) continuously in step (2), or by introducing around 10% of all, by weight, of (A) in step (1) and the balance in step (2).

The process for preparing a PMMA seed latex according to the invention uses at least one radical generator.

The expression "at least one radical generator" is understood to mean that the process for preparing a PMMA seed latex may use one or more radical generators.

Preferably, according to the process according to the invention, a single radical generator is used. In the remainder of the text, the expression "radical generator" used in the singular or plural should be understood as denoting one or more radical generators, except where denoted otherwise.

The radical generators are advantageously water-soluble.

The expression "water-soluble radical generators" is understood to mean the radical generators that are soluble in water.

The radical generators are advantageously chosen from water-soluble diazo compounds and water-soluble peroxides.

As examples of water-soluble diazo compounds, mention may be made of:
2-(carbamoylazo)isobutyronitrile;
4,4'-azobis(4-cyanovaleric acid);
ammonium 4,4'-azobis(4-cyanovalerate);
sodium 4,4'-azobis(4-cyanovalerate);
potassium 4,4'-azobis(4-cyanovalerate);
2,2'-azobis(N,N'-dimethyleneisobutyramidine);
2,2'-azobis(N,N'-dimethyleneisobutyramidine)dihydrochloride;
2,2'-azobis(2-amidinopropane)dihydrochloride:
2,2'-azobis[2-methyl-N-(1,1-bis(hydroxymethyl)-2-hydroxyethyl)propionamide];
2,2'-azobis[2-methyl-N-(1,1-bis(hydroxymethyl)ethyl)propionamide];
2,2'-azobis[2-methyl-N-(2-hydroxyethyl)propionamide]; and
2,2'-azobis(isobutyramide) dihydrate.

4,4'-azobis(4-cyanovaleric acid), ammonium 4,4'-azobis(4-cyanovalerate), sodium 4,4'-azobis(4-cyanovalerate) and potassium 4,4'-azobis(4-cyanovalerate) are preferred.

As examples of water-soluble peroxides, mention may be made of:
inorganic peroxides such as sodium, potassium and ammonium persulphates;
tert-butyl hydroperoxide;
hydrogen peroxide; and
perborates.

The water-soluble peroxides are preferred. Among these, alkali metal persulphates such as sodium persulphate and potassium persulphate, ammonium persulphate and also hydrogen peroxide are particularly preferred. Alkali metal persulphates and ammonium persulphate are more particularly preferred.

In a particularly preferred manner, the process according to the invention uses a single radical generator (B) and this is chosen from alkali metal persulphates and ammonium persulphate.

According to step (1) of the process for preparing a PMMA seed latex, at least one fraction of (B) is introduced into a reactor.

Preferably at least 50%, particularly preferably at least 60%, more particularly preferably at least 65% and most particularly preferably at least 70% of all, by weight, of (B) are introduced in step (1).

The process for preparing a PMMA seed latex according to the invention uses (C) at least one emulsifier in a total amount of at least 4% by weight relative to the total weight of (A).

The expression "at least one emulsifier" is understood to mean that the process for preparing a PMMA seed latex may use one or more emulsifiers.

Preferably, according to the process according to the invention, a single emulsifier is used. In the remainder of the text, the expression "emulsifier" used in the singular or plural should be understood as denoting one or more emulsifiers, except where denoted otherwise.

The emulsifiers may be anionic emulsifiers, non-ionic emulsifiers or cationic emulsifiers.

Among the anionic emulsifiers, mention may be made, non-limitingly, of alkyl sulphates such as sodium lauryl sulphate, alkyl sulphonates such as sodium dodecylbenzene sulphonate and sodium 1-hexadecane sulphonate in pure form or in the form of a mixture of $C_{12}$-$C_{20}$ alkyl sulphonates sometimes known as paraffin sulfonates, alkylaryl monosulphonates or disulphonates and dialkyl sulphosuccinates such as sodium diethylhexyl sulphosuccinate and sodium dihexyl sulfosuccinate.

Among the non-ionic emulsifiers, mention may be made, non-limitingly, of alkyl ethoxylated or alkylaryl ethoxylated derivatives, alkyl propoxylated or alkylaryl propoxylated derivatives, and sugar esters or ethers.

Among the cationic emulsifiers, mention may be made of ethoxylated alkyl amines and propoxylated alkylamines.

The emulsifiers are preferably anionic emulsifiers, optionally as a mixture with one or more non-ionic emulsifiers. Anionic emulsifiers are particularly preferred.

The process according to the invention uses a total amount of at least 4%, preferably at least 5%, particularly preferably at least 7% and more particularly preferably at least 8% by weight, relative to the total weight of (A), of at least one emulsifier, preferably of a single emulsifier.

The process for preparing a PMMA seed latex according to the invention advantageously uses a total amount of at most 20%, preferably at most 15% and particularly preferably at most 12% by weight, relative to the total weight of (A), of at least one emulsifier, preferably of a single emulsifier.

According to step (1) of the process for preparing a PMMA seed latex, at least 2.5% by weight of (C) relative to the total weight of (A) is introduced into a reactor.

Preferably at least 3%, particularly preferably at least 5% and more particularly preferably at least 7% by weight of (C) relative to the total weight of (A) is introduced in step (1).

Preferably at most 20%, particularly preferably at most 15% and more particularly preferably at most 12% by weight of (C) relative to the total weight of (A) is introduced in step (I).

Preferably at most 5% and particularly preferably at most 2.5% by weight of (C) relative to the total weight of (A) is introduced in step (2).

Good results have been obtained by introducing all of (C), preferably around 10% by weight of (C) relative to the total weight of (A), in step (1), or by introducing around 8% by weight of (C) relative to the total weight of (A) in step (1) and around 2% by weight of (C) relative to the total weight of (A) in step (2).

According to step (1) of the process for preparing a PMMA seed latex, at least one fraction of (D) is introduced into a reactor.

Preferably at least 70% of all, by weight, of (D), particularly preferably at least 75% of all, by weight, of (D) and more particularly preferably at least 80% of all, by weight, of (D) are introduced in step (1).

Therefore, during step (1), advantageously no reaction occurs.

According to step (2) of the process for preparing a PMMA seed latex, the contents of the reactor are reacted.

The expression "the contents of the reactor are reacted" is understood to mean that it is in step (2) that the polymerization reaction is initiated.

In order to make the contents of the reactor react according to step (2), means are used by which radicals are generated within it. For this purpose, it is especially possible to heat the contents of the reactor or to expose it to an intense light radiation. Preferably, the contents of the reactor are heated.

The temperature at which the contents of the reactor are reacted is advantageously equal to at least 30° C. and preferably at least 40° C. In addition, it is advantageously equal to at most 200° C. and preferably at most 120° C.

The process according to the invention is advantageously a continuous process. The expression "continuous process" is understood to mean that at least one fraction of one of (A), (B), (C) or (D) is introduced during step (2), contrary to a batch or discontinuous process according to which all of (A), (B), (C) and (D) would be introduced in step (1).

According to step (2), the contents of the reactor are reacted while continuously introducing thereinto the balance of (A), (B), (C) and (D). The expression "continuous introduction" is understood to mean that the introduction is carried out over a certain time period and that it is not carried out in a single injection at a given time. It is preferably carried out with a certain rate which is particularly preferably constant.

The balance of (A), (B), (C) and (D) may be introduced independently or as a mixture. Preferably, the balance of (A), (C) and (D) is introduced as a mixture and the balance of (B) separately from this mixture.

The process for preparing a PMMA seed latex preferably takes place in the absence of a viscosity reducer, such as for example an ionic electrolyte.

Advantageously, step (2) is continued until the MMA and optionally the other comonomer or comonomers have reacted to a certain extent. Preferably, step (2) is continued until the degree of conversion of the MMA and optionally of the other comonomer or comonomers is at least 82% and at most 100%.

According to step (3) of the process for preparing a PMMA seed latex, a methyl methacrylate polymer seed latex is obtained and isolated.

According to step (3), the PMMA seed latex is therefore isolated from the reactor in which it was prepared. The process for preparing a PMMA seed latex according to the invention is therefore advantageously an ex situ process, that is to say a process at the end of which the seed latex is isolated, contrary to an in situ process according to which the seed latex is synthesized in the reactor where it is then used for a subsequent polymerization.

The seed latex may or may not then be subjected to stripping of the residual monomers before its subsequent use. In the case where stripping is carried out, it may be by stripping under vacuum or else by stripping under vacuum and simultaneously injecting steam into the latex. Preferably, when it is carried out, it is by stripping under vacuum.

According to the process for preparing a PMMA seed latex according to the invention, the particles of the methyl methacrylate polymer seed latex have an average diameter, measured by hydrodynamic fractionation, advantageously less than or equal to 60 nm, preferably less than or equal to 55 nm, particularly preferably less than or equal to 50 nm, more particularly preferably less than or equal to 40 nm and most particularly preferably less than or equal to 35 nm.

The hydrodynamic fractionation method used to determine the average diameter of the particles is explained in the experimental section below. What is understood by average diameter and by standard deviation and coefficient of variation is also defined therein.

According to one particularly preferred variant, the process for preparing a methyl methacrylate polymer seed latex according to the invention is characterized in that it comprises the steps according to which:

(1) at least one fraction of (B), at least 7% by weight of (C) relative to the total weight of (A), at least 80% of all, by weight, of (D) and at most 15% of all, by weight, of (A) are introduced into a reactor; then
(2) the contents of the reactor are reacted, while continuously introducing thereinto the balance of (A), (B), (C) and (D); and
(3) a PMMA seed latex is obtained and isolated.

Another subject of the present invention is a methyl methacrylate polymer seed latex characterized in that the particles of this latex have an average diameter, measured by hydrodynamic fractionation, less than or equal to 60 nm and in that the particle diameter distribution, determined by hydrodynamic fractionation, is monomodal and is characterized by a standard deviation less than or equal to 20 nm.

The definitions and preferences defined previously within the context of the process for preparing a methyl methacrylate polymer latex apply to the methyl methacrylate polymer seed latex according to the invention.

The expression "monomodal distribution" of the latex particle diameters, determined by hydrodynamic fractionation, a method explained in the examples below, is understood to mean that the latex particle diameters are distributed about only one mode, in other words, a single mode. A bimodal distribution, on the other hand, is characterized by a distribution about two separate modes.

The distribution of the particles of the methyl methacrylate polymer seed latex is characterized by a standard deviation preferably less than or equal to 15 nm and particularly preferably less than or equal to 10 nm.

The distribution of the particles of the methyl methacrylate polymer seed latex is characterized, in addition, by a coefficient of variation advantageously less than or equal to 40%, preferably less than or equal to 35% and more particularly preferably less than or equal to 30%.

What is understood by average diameter, particle distribution, standard deviation and coefficient of variation, as determined by hydrodynamic fractionation, is defined in the experimental section.

The seed latex of a methyl methacrylate polymer is advantageously characterized, in addition, by a lump content, measured by filtering the latex through a filtration pocket having an average opening of 55 μm and by weighing the wet lumps recovered, of less than 10 g.

The expression "lump content of less than 10 g" is understood to mean that no detectable amount of lumps is recovered during filtration of the latex through a filtration pocket having an average opening of 55 μm.

The seed latex of a methyl methacrylate polymer is advantageously obtained by the process for preparing a methyl methacrylate polymer according to the invention.

Next, one subject of the present invention is a process for preparing a chlorinated vinyl polymer latex by radical polymerization in aqueous emulsion of at least one chlorinated vinyl monomer, characterized in that the polymerization takes place in the presence of at most 3% by weight, expressed relative to the total weight of the monomers, of dry matter of a methyl methacrylate polymer seed latex obtained by the process according to the invention.

What is understood by latex and polymerization in aqueous emulsion is defined above for the process for preparing a PMMA seed latex.

The chlorinated vinyl polymer latex is advantageously characterized by a solids concentration of around at least 45% by weight. The chlorinated vinyl polymer latex is advantageously characterized by a solids concentration of around at most 75% by weight.

The individual polymer particles in the chlorinated vinyl polymer latex advantageously have average diameters of at least 0.12 μm, preferably at least 0.13 μm, particularly preferably at least 0.14 nm and more particularly preferably at least 0.15 nm. They advantageously have average diameters of at most 0.3 μm, preferably at most 0.2 μm.

The expression "at least one chlorinated vinyl monomer" is understood to mean one or more of a chlorinated vinyl monomer of which one of them is used as the main monomer.

The expression "main monomer" is understood to denote the monomer present in an amount of at least $100/n$ wt % of the monomer blend and which will create at least $100/n$ wt % of the monomer units of the polymer obtained, n being the number of monomers in the monomer blend.

The expression "chlorinated vinyl monomer" is understood to denote the monoethylenically-unsaturated chlorinated monomers that are aliphatic and that have one or more chlorine atoms as the only heteroatom(s). As examples of chlorinated vinyl monomers, mention may be made of chlorinated vinyl monomers of which the number of chlorine atoms is equal to 1, chlorinated vinyl monomers of which the number of chlorine atoms is equal to 2, trichloroethylene, 1,1,3-trichloropropene and tetrachloroethylene.

A first preferred family of chlorinated vinyl monomers is formed by the chlorinated vinyl monomers of which the number of chlorine atoms is equal to 1. As examples of chlorinated vinyl monomers of which the number of chlorine atoms is equal to 1, mention may be made of allyl chloride, crotyl chloride and, with a more particular mention, vinyl chloride which results in the formation of vinyl chloride polymers.

The expression "vinyl chloride polymers" is understood to mean vinyl chloride homopolymers and copolymers.

The expression "vinyl chloride copolymers" is understood to mean copolymers of vinyl chloride, which is the main monomer, with one or more monomers with which it is copolymerizable. Among the monomers that are copolymerizable with vinyl chloride, mention may be made, non-limitingly, of styrenic monomers such as styrene, (meth)acrylic monomers such as n-butyl acrylate and methyl methacrylate, vinyl esters such as vinyl acetate and olefinic monomers such as ethylene, propylene and butadiene. Vinyl acetate is particularly preferred. Among the vinyl chloride polymers, vinyl chloride homopolymers are preferred.

A second preferred family of chlorinated vinyl monomers is formed by the chlorinated vinyl monomers of which the number of chlorine atoms is equal to 2. As examples of chlorinated vinyl monomers of which the number of chlorine atoms is equal to 2, mention may be made of 1,1-dichloropropene, 1,3-dichloropropene, 2,3-dichloropropene and, with a more particular mention, vinylidene chloride.

The chlorinated vinyl monomer used as the main monomer is particularly preferably chosen from the chlorinated vinyl monomers of which the number of chlorine atoms is equal to 2, and is more particularly preferably vinylidene chloride. The polymers in question are therefore then more particularly preferably vinylidene chloride polymers.

The expression "vinylidene chloride polymers" is understood to mean vinylidene chloride copolymers.

The expression "vinylidene chloride copolymers" is understood to mean copolymers of vinylidene chloride, which is the main monomer, with one or more monomers with which it is copolymerizable.

Among the monomers that are copolymerizable with vinylidene chloride, mention may be made, non-limitingly, of vinyl chloride, vinyl esters such as for example vinyl acetate, vinyl ethers, acrylic acids, esters and amides, methacrylic acids, esters and amides, acrylonitrile, methacrylonitrile, styrene, styrene derivatives, butadiene, olefins such as for example ethylene and propylene, itaconic acid and maleic anhydride, but also copolymerizable surfactants such as 2-acrylamido-2-methylpropanesulphonic acid (AMPS) or one of its salts, for example the sodium salt, 2-sulphoethylmethacrylic acid (2-SEM) or one of its salts, for example the sodium salt, and the phosphate ester of methacrylate-terminated polypropylene glycol (such as the product SIPOMER PAM-200 from Rhodia) or one of its salts, for example the sodium salt.

Particularly preferred vinylidene chloride copolymers are those containing vinylidene chloride in an amount of at least 50 wt % and, as copolymerizable monomers, vinyl chloride and/or at least one monomer chosen from maleic anhydride, itaconic acid, and the (meth)acrylic monomers corresponding to the general formula:

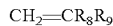

$$CH_2=CR_8R_9$$

in which $R_8$ is chosen from hydrogen and the methyl radical and $R_9$ is chosen from the —CN radical and the —CO—$R_{10}$ radical in which $R_{10}$ is chosen from the —OH radical, the —O—$R_{11}$ radicals with $R_{11}$ chosen from the linear or branched alkyl radicals containing from 1 to 18 carbon atoms optionally bearing one or more —OH radicals, the epoxyalkyl radicals containing from 2 to 10 carbon atoms and the alkoxyalkyl radicals containing a total of 2 to 10 carbon atoms and finally $R_{10}$ is also chosen from the —$NR_{12}R_{13}$ is radicals in which $R_{12}$ and $R_{13}$, which are the same or different, are chosen from hydrogen and the alkyl radicals containing from 1 to 10 carbon atoms, optionally bearing one or more —OH radicals, the aforementioned copolymerizable surfactants and the phosphate ester of methacrylate-terminated polypropylene glycol or one of its salts, for example the sodium salt.

More particularly preferred vinylidene chloride copolymers are those containing, as copolymerizable monomers, vinyl chloride and/or at least one monomer chosen from maleic anhydride, itaconic acid, the (meth)acrylic monomers that are methyl acrylate, methyl methacrylate, ethyl acrylate, ethyl methacrylate, n-butyl acrylate, n-butyl methacrylate, 2-ethylhexyl acrylate, 2-ethylhexyl methacrylate, 2-hydroxyethyl acrylate, 2-hydroxyethyl methacrylate, glycidyl methacrylate, glycidyl acrylate, acrylonitrile, methacrylonitrile, acrylic acid, methacrylic acid, acrylamide, N-methylolacrylamide, 2-acrylamido-2-methylpropanesulphonic acid (AMPS) or one of its salts, for example the sodium salt, 2-sulphoethylmethacrylic acid (2-SEM) or one of its salts, for example the sodium salt, and the phosphate ester of methacrylate-terminated polypropylene glycol or one of its salts, for example the sodium salt.

Most particularly preferred vinylidene chloride copolymers are those containing, as copolymerizable monomers, at least one monomer chosen from maleic anhydride, itaconic acid, the (meth)acrylic monomers that are methyl acrylate, methyl methacrylate, ethyl acrylate, ethyl methacrylate, n-butyl acrylate, n-butyl methacrylate, 2-ethylhexyl acrylate, 2-ethylhexyl methacrylate, 2-hydroxyethyl acrylate, 2-hydroxyethyl methacrylate, glycidyl methacrylate, glycidyl acrylate, acrylonitrile, methacrylonitrile, acrylic acid, methacrylic acid, acrylamide, N-methylolacrylamide, 2-acrylamido-2-methylpropanesulphonic acid (AMPS) or one of its salts, for example the sodium salt, 2-sulphoethylmethacrylic acid (2-SEM) or one of its salts, for example the sodium salt, and the phosphate ester of methacrylate-terminated polypropylene glycol or one of its salts, for example the sodium salt.

Advantageously, the amount of vinylidene chloride in the vinylidene chloride copolymers varies from 50 to 95% by weight, preferably from 60 to 95% by weight and particularly preferably from 70 to 95% by weight.

Advantageously, the amount of vinyl chloride in the vinylidene chloride copolymers varies from 0.5 to 50% by weight, preferably from 0.5 to 40% by weight and particularly preferably from 0.5 to 30% by weight.

Advantageously, the amount of itaconic acid and/or (meth) acrylic monomer(s) in the vinylidene chloride copolymers varies from 1 to 50% by weight, preferably from 2 to 40% by weight and particularly preferably from 2 to 30% by weight.

According to the process for preparing a chlorinated vinyl polymer latex according to the invention, the polymerization takes place in the presence of at most 3%, preferably at most 2.5%, particularly preferably at most 2%, more particularly preferably at most 1.5% and most particularly preferably at most 1.3% by weight, expressed relative to the total weight of the monomers, of dry matter of a PMMA seed latex obtained by the process according to the invention.

The expression "in the presence" is understood to mean that the seed latex is in the polymerization medium when this polymerization takes place. Although it is not excluded that a small amount of the PMMA seed latex may be added at a later time, it is preferred that all of the PMMA seed latex is present when the contents of the reactor are reacted. Particularly preferably, all of the PMMA seed latex is introduced at the start and is therefore present when the contents of the reactor are reacted.

The expression "at the start" is understood to mean with the initial charge.

The expression "at a later time" is understood to mean that the introduction begins after the initial charge has been introduced and the polymerization reaction initiated.

The process for preparing a chlorinated vinyl polymer latex according to the invention advantageously uses at least one radical generator and at least one emulsifier.

The expression "at least one radical generator" is understood to mean that the process for preparing a chlorinated vinyl polymer latex may use one or more radical generators.

In the remainder of the text, the expression "radical generator" used in the singular or plural should be understood as denoting one or more radical generators, except where denoted otherwise.

The radical generators are advantageously water-soluble. They are advantageously chosen from water-soluble diazo compounds, water-soluble peroxides and redox systems combining a water-soluble peroxide and a reducing agent.

As examples of water-soluble diazo compounds, mention may be made of those which were mentioned previously for the process for preparing a PMMA latex according to the invention.

4,4'-azobis(4-cyanovaleric acid), ammonium 4,4'-azobis (4-cyanovalerate), sodium 4,4'-azobis(4-cyanovalerate) and potassium 4,4'-azobis(4-cyanovalerate) are preferred.

As examples of water-soluble peroxides, mention may be made of those which were mentioned previously for the process for preparing a PMMA latex according to the invention.

The water-soluble peroxides are preferred. Among these, alkali metal persulphates such as sodium persulphate and potassium persulphate, ammonium persulphate and also hydrogen peroxide are particularly preferred. Alkali metal persulphates and ammonium persulphate are more particularly preferred.

As examples of water-soluble peroxides that make up the redox system, mention may be made of the aforementioned water-soluble peroxides. As reducing agents that make up the redox system, mention may be made of alkali metal sulphites, alkali metal metabisulphites and ascorbic acid.

Preferred redox systems are the alkali metal or ammonium persulphate/alkali metal sulphite, alkali metal or ammonium persulphate/alkali metal metabisulphite, alkali metal or ammonium persulphate/ascorbic acid, hydrogen peroxide/ascorbic acid, hydrogen peroxide/ferrous sulphate and f-butyl hydroperoxide/sulphoxylate systems. Sodium sulphite and sodium metabisulphite are particularly preferred among the alkali metal sulphites and metabisulphites respectively.

Particularly preferably, the process for preparing a chlorinated vinyl polymer latex according to the invention uses a single water-soluble radical generator. This is more particularly preferably chosen from alkali metal persulphates, ammonium persulphate, hydrogen peroxide and alkali metal or ammonium persulphate/sodium sulphite, alkali metal or ammonium persulphate/sodium metabisulphite, alkali metal or ammonium persulphate/ascorbic acid and hydrogen peroxide/ascorbic acid redox systems.

An oil-soluble radical generator (soluble in the monomer(s)) may optionally be added, moreover, at the end of the polymerization.

One fraction of the radical generator(s) is preferably introduced at the start and another fraction at a later time.

When the introduction takes place at a later time, it may be carried out continuously or as a single injection. What is understood by continuous introduction is defined above for the process for preparing a PMMA seed latex.

The expression "at least one emulsifier" is understood to mean that the process for preparing a chlorinated vinyl polymer latex may use one or more emulsifiers.

In the remainder of the text, the expression "emulsifier" used in the singular or plural should be understood as denoting one or more emulsifiers, except where denoted otherwise.

The emulsifiers may be anionic emulsifiers, non-ionic emulsifiers or cationic emulsifiers.

As examples of anionic emulsifiers, mention may be made of those which were mentioned previously for the process for preparing a PMMA latex according to the invention.

As examples of non-ionic emulsifiers, mention may be made of those which were mentioned previously for the process for preparing a PMMA latex according to the invention.

As examples of cationic emulsifiers, mention may be made of those which were mentioned previously for the process for preparing a PMMA latex according to the invention.

The emulsifiers are preferably anionic emulsifiers, optionally as a mixture with one or more non-ionic emulsifiers. Anionic emulsifiers are particularly preferred.

One fraction of the emulsifier(s) is preferably introduced at the start and another fraction at a later time.

When the introduction takes place at a later time, it is preferably carried out continuously.

According to the process for preparing a chlorinated vinyl polymer latex according to the invention, the monomers may be introduced into the polymerization medium in several different ways and in a different form.

Thus, according to a first variant, some monomers are introduced at the start in one go and the others at a later time, either in one go, or continuously, According to a second variant, all the monomers are introduced at the start in one go.

According to a third variant, all the monomers are introduced continuously, at a later time.

According to a fourth variant, one fraction of all of the monomers is introduced at the start and the balance is introduced at a later time, either in one go, or continuously.

The monomers may be introduced individually (in the pure state or in the form of an emulsion) or after having been blended (the blend being introduced as is or in the form of an emulsion).

After reacting the contents of the reactor, using similar means to those mentioned for the process for preparing a PMMA seed latex, preferably by heating the contents of the reactor until the degree of conversion of the monomers is advantageously at least 82% and preferably at most 100%, a chlorinated vinyl polymer latex is advantageously obtained.

The temperature at which the contents of the reactor are reacted is advantageously equal to at least 30° C. and preferably at least 40° C. In addition, it is advantageously equal to at most 200° C. and preferably at most 120° C.

The latex obtained is then advantageously subjected to stripping of the residual monomers before its subsequent use. Stripping may be carried out by stripping under vacuum or else by stripping under vacuum and simultaneously injecting steam into the latex. Preferably, stripping is carried out by stripping under vacuum and simultaneously injecting steam into the latex.

A final subject of the present invention is a chlorinated vinyl polymer latex comprising particles dispersed in the water of an interpolymer of particles of a methyl methacrylate polymer seed latex, whose average diameter, measured by hydrodynamic fractionation, is less than or equal to 60 nm, and of a chlorinated vinyl polymer; the particles of the chlorinated vinyl polymer latex being characterized by an average diameter, measured by hydrodynamic fractionation, greater than or equal to 120 nm.

The average diameter of the particles of the chlorinated vinyl polymer latex, as measured by hydrodynamic fractionation, is preferably greater than or equal to 130 nm, particularly preferably greater than or equal to 140 nm, and more particularly preferably greater than or equal to 150 nm.

The distribution of the particles of the chlorinated vinyl polymer latex, as determined by hydrodynamic fractionation, is advantageously monomodal.

The distribution of the particles of the chlorinated vinyl polymer latex is characterized, in addition, by a coefficient of variation advantageously less than or equal to 12%, preferably less than or equal to 10% and more particularly preferably less than or equal to 8%.

The chlorinated vinyl polymer latex according to the invention is characterized, in addition, by the fact that it enables films to be produced that are advantageously characterized by the absence of microcracks.

The films obtained are advantageously characterized by a crystallinity, after 1 day at 30° C., measured in the manner described in the examples, less than or equal to 1.1.

The films obtained are advantageously characterized by a crystallinity, after 1 week at 23° C., measured in the manner described in the examples, less than or equal to 1.1.

The films obtained are advantageously characterized by a flexibility, after treating for 1 day at 30° C. and 50% relative humidity, measured in the manner described in the examples, greater than or equal to 80 cm, preferably greater than 90 cm.

The definitions and preferences defined previously within the context of the process for preparing a methyl methacrylate polymer latex and the process for preparing a chlorinated vinyl polymer apply to the chlorinated vinyl polymer latex according to the invention.

In particular, the chlorinated vinyl polymer latex according to the invention is preferably a vinylidene chloride polymer latex.

In particular, the methyl methacrylate polymer seed latex is preferably a MMA homopolymer seed latex.

The chlorinated vinyl polymer latex according to the invention is advantageously obtained by the process for preparing a chlorinated vinyl polymer according to the invention.

The methyl methacrylate polymer seed latex is advantageously the methyl methacrylate polymer seed latex according to the invention described previously.

Since the process for preparing a PMMA seed latex according to the invention is an ex situ process, it has the advantage of being characterized by a better reproducibility of the particle size and the polymerization kinetics. Moreover, it is advantageously characterized by the fact that it allows automation of the seed supply to the reactor for polymerization of chlorinated vinyl monomers, in particular VDC. Moreover, it is characterized by a high reproducibility (precision in the amounts of seed latex used in the polymerization) and high productivity in so far as it is not necessary to precede each polymerization cycle by the "in situ" synthesis of the seed latex. These various advantages are not, on the other hand, presented by an "in situ" synthesis of the seed latex.

The nanoscale size of the PMMA seed latex furthermore makes it possible to control the diameter of particles of a chlorinated vinyl polymer latex, in particular a PVDC latex, and to prevent the formation of parasite particle populations.

The use of a PMMA seed latex for the polymerization of chlorinated vinyl monomers, in particular VDC, moreover has the advantage of enabling the production of a latex which is suitable for applications in which the current regulations do not allow the use of certain compounds, in so far as PMMA is not excluded by them.

Finally, the PMMA seed latex according to the invention has proved to have the characteristics required in order to be used as a base for the polymerization of chlorinated vinyl monomers, in particular VDC, unlike PVDC-type seed latices.

The process for preparing a chlorinated vinyl polymer latex, in particular a PVDC latex, involving a PMMA seed latex prepared by the process for preparing a PMMA seed latex according to the invention, has the advantage of allowing a considerable gain in the polymerization cycle time of the monomers.

It also makes it possible to quite significantly reduce crusting of polymerization autoclaves. A substantial gain in terms of autoclave cleaning therefore follows, and also an increase in productivity.

This same process makes it possible to obtain latices which are characterized by particle diameters and a thermal stability which are comparable to the latices of the prior art.

Furthermore, the process makes it possible to obtain a latex of chlorinated vinyl polymers, in particular a PVDC latex, which may give rise to the formation of high-quality films, having the barrier properties required for the intended applications, but also a lower crystallization rate and improved flexibility, which is particularly advantageous for the intended applications.

The following examples are intended to illustrate the invention without however limiting the scope thereof.

Determination of the Amount of Wet Crust

The amount of wet crust was determined by collecting the wet crust present inside the polymerization autoclave, especially on its walls and on the stirrer blades. The crust was collected, then weighed in the wet state. The result was expressed in grams.

Determination of the Amount of Lumps

The amount of lumps in the latex was determined by filtering the latex through a filtration pocket having an average opening of 55 µm (supplier: GAF). The wet lumps rejected by this pouch were collected then weighed in the wet state.

Measurement of the Particle Diameter Distribution

The particle diameter distribution of the PMMA seed latex and of the non-additivated PVDC latex were measured by hydrodynamic fractionation on a machine sold by Polymer Laboratories: PL-PSDA (particle size distribution analyser).

The measurement principle is the following:

An eluent is pumped continuously into a column filled with non-porous polystyrene-divinylbenzene microbeads. The space between the microbeads behaves as a multitude of capillary channels. The sample to be analysed and a marker were introduced into the machine simultaneously by means of a special two-way valve which does not disturb the flow of eluent. The role of the marker (sodium benzoate) is to guarantee a constant elution time regardless of the pressure variations in the column. A laminar-type flow is created in the capillary channels of the column. The large particles move into the area where the flow rate is the highest, the small particles into the area where it is the lowest. The large particles "exit" first. The concentration of the particles was determined using a UV detector.

The column was integrated into a cartridge. PL sell three types of cartridges: type 1: from 5 nm to 300 nm, type 2: from 20 nm to 1200 nm and type 3: from 500 nm to 2000 nm. For the measurement, a type 2 cartridge was used.

The latex sample to be analysed was diluted at around 1% (enough to have a suitable response from the UV detector) using 230 mm Pasteur pipettes. Before being injected into the machine, the diluted sample was filtered through a 1.2 µm filter.

The average diameter of the particles (d) is defined as the sum of the individual particle diameters divided by the total number of particles. It corresponds to the formula:

$$d = \frac{\sum_{i=1}^{n} v_i x_i}{\sum_{i=1}^{n} v_i}$$

in which $x_i$ is the diameter of the particle i and $v_i$ is the volume percentage of particles of diameter $x_i$.

The standard deviation (σ) corresponds to the following formula (with the same definitions for $x_i$ and $v_i$):

$$\sigma = \sqrt{\frac{\sum_{i=1}^{n} v_i (x_i - d)^2}{\sum_{i=1}^{n} v_i}}$$

The coefficient of variation (C.V.) is itself the standard deviation of the particle diameter distribution expressed as a percentage of the average particle diameter and corresponds to the following formula:

$$C.V. = \frac{\sigma}{d} \times 100$$

The coefficient of variation therefore advantageously makes it possible to compare the spread of the distribution of particles between latices of which the particles have a different average diameter.

Test of the Thermal Stability of the PVDC Latex at 80° C.

The procedure for measurement of the thermal stability test was the following:

Filling a glass vial (length/diameter=100 mm/15 mm) with the latex to be tested up to a height of 60 mm;
Sealing the vial using a threaded polypropylene cap; and
Placing the vial in a ventilated oven at 80° C. and observing the change in the latex once a day.

The result of the test is the time in days at the end of which a deposit greater than or equal to 2.5+/−0.5 mm is formed at the bottom of the vial.

If there is no deposit after 30 days, the test is stopped; the stability of the latex at 80° C. is thus greater than 30 days.

The thermal stability measurement was carried out on the additivated PVDC latex.

Measurement of the Crystallinity of a Film Obtained from the PVDC Latex

The crystallinity was measured by ATR-IR infrared using a germanium crystal. The sample was kept in perfect contact with the crystal, PVDC side against the crystal. The two bands considered for the crystallinity index measurement were at 1070 cm$^{-1}$ (amorphous band) and 1040 cm$^{-1}$ (crystalline band). The base line was taken at 1130 cm$^{-1}$ and the index was measured as follows: 1=(absorbance 1040−absorbance 1130)/(absorbance 1070−absorbance 1130).

The machine used was a Bruker FTIR, Vertex 70 model, with a special horizontal ATR accessory made by Harrick, horizon model, containing the germanium crystal, the dimensions of which were 50×10×2 mm with an angle of 45°.

Measurement of the Water Vapour Transmission Rate of a Film Obtained from the PVDC Latex The water vapour transmission rate of a film obtained from the PVDC latex was measured according to the standard ASTM F-1249 on a Permatran W 3/31 machine from Mocon at 38° C. and 90% relative humidity; the sample having undergone an accelerated ageing for 2 days at 40° C. before the measurement.

Measurement of the Flexibility of a Film Obtained from the PVDC Latex

The flexibility of a coated film obtained from the PVDC latex was measured according to the falling weight method given in standard ISO 7765-1.

The principle of the method consists in the free fall of a given weight from a variable height (between 0 and 90 cm) onto a sample of the film to be measured.

The height at which the weight is released and also the type of deformation or fracture of the sample (ductile or brittle) characterizes the flexibility of the coated film.

The samples were 10×10 cm squares cut from the central part of the coated PVDC film. They underwent an accelerated ageing for 1 day at 30° C.

The measurement was reproduced until 5 valid results of the same type were obtained.

EXAMPLE 1 (ACCORDING TO THE INVENTION)

Preparation of a PMMA Seed Latex

An 8.7 m$^3$ polymerization autoclave (stirred at 20 rpm), equipped with a cooling circuit, was successively charged with 3699 l of demineralized water, 14.07 kg (6.7 g of active material/kg of monomer) of a powdered ammonium persulphate solution and 1023 l (100 g of active material/kg of monomer) of a sodium dodecylbenzenesulphonate solution containing 20% of active material (DISPONIL LDBS 20 supplied by Cognis). The autoclave was closed then subjected to two vacuum operations at 140 mbar absolute pressure.

The stirring speed was then increased to 60 rpm while bringing the mixture to 85° C. When the temperature reached 84° C., 2100 kg of methyl methacrylate was added at a constant rate over 3 hours while adding 151 l (2.87 g of active material/kg of monomer) of a 40 g/l ammonium persulphate solution at a constant rate over the same 3 hour duration.

After the end of the methyl methacrylate and ammonium persulphate injections, the polymerization was continued until a temperature difference of less than 5° C. was obtained between the temperature of the reaction medium and that of the cooling circuit, followed by a post-polymerization of one hour. The stirring speed was then reduced to 20 rpm and the latex was degassed then stripped under vacuum at 65° C. for 3 hours.

The solids content of the PMMA seed latex thus polymerized was 32.5%. The average diameter of the particles, determined by hydrodynamic fractionation as described above, was 34 nm. The particle diameter distribution was monomodal with a standard deviation of 6 nm.

EXAMPLE 2 (ACCORDING TO THE INVENTION)

Polymerization of VDC in Aqueous Emulsion in the Presence of the PMMA Seed Latex Prepared in Example 1

A 40 l polymerization autoclave equipped with a cooling circuit was successively charged with 10.9 l of demineralized water and 240 ml of a 0.1 g/l iron nitrate solution. The stirring speed of the medium was brought to 160 rpm. It was then charged with 492 g (8 g of dry matter/kg of monomers) of the PMMA seed latex prepared in Example 1. The autoclave was then sealed and subjected to two vacuum operations at 100 mbar absolute pressure. Next, successively introduced by suction, were 212 ml of a 50 g/l secondary alkyl sulphonate solution (Mersolat H40 supplied by Bayer), 18.17 kg of vinylidene chloride, 1.83 kg of methyl acrylate and 62 g of acrylic acid.

After stirring for 5 minutes, the temperature of the reaction medium was raised to 55° C. At T=52° C., 500 ml of a 14 g/l sodium metabisulphite solution were added. At T=54° C.+20 min, 210 ml of a 2 g/l ammonium persulfate solution were added, and the stirring speed was reduced to 120 rpm. The end of the introduction of ammonium persulphate was taken as the beginning of the polymerization ($T_o$).

At $T_o$+30 min, 781.2 ml of 425 g/l Mersolat H40 were added at a constant rate over 5 hours while adding, at the constant rate of 50 ml/h, a 2 g/l ammonium persulphate solution. The injection of ammonium persulphate was maintained until a temperature difference of 2° C. was obtained between the temperature of the reaction medium and that of the cooling circuit. At that time, 150 ml of a 33.3 g/l ammonium persulphate solution were added in one go, and the latex was post-polymerized for 60 minutes. The polymerization time was 12 hours.

The latex was then hot-degassed then stripped under vacuum at 70° C. During the stripping, the stirring speed was reduced to 110 rpm. After stripping, the latex was cooled to 20° C., then filtered through a 55 μm filtration pocket. The following properties of the latex were then adjusted: the surface tension was adjusted to 30-33 mN/m with a 425 g/l Mersolat H40 solution, the pH was adjusted to 2.5-3.5 with a 150 g/l trisodium phosphate solution, post-modified with 38.5 ml/kg of dry matter of Gleitmittel 8645 wax (supplied by BASF) containing 20% of active material and with 16.7 ml/kg of dry matter of a 150 g/l $Na_2OS$ Promex solution (supplied by YDS) and finally the solids content was adjusted to between 57% and 58%.

EXAMPLE 3 (ACCORDING TO THE INVENTION)

Properties of the PVDC Latex Obtained in Example 2

The properties of the PVDC latex obtained in Example 2 were measured in the manner described previously. The result is given in Table 1.

A film was produced using the PVDC latex obtained in Example 2. In order to do this, a primer was first applied as a tie layer on a 250 μm thick film of virgin PVC. After drying, a first layer of PVDC was then coated on, and after drying the film was rewound. The operation was repeated but without primer for coating of the second layer of PVDC, which was superposed on the first, and so on until the fourth layer.

This coating was carried out on a Kroenert line with the following characteristics:

line speed: 100 m/min;

corona treatment: 1.5 kW;

the primer was the product Emuldur 381A supplied by BASF –1 $g/m^2$;

weight of PVDC: 40 $g/m^2$ over 3 layers;

"reverse" rotation (110%) of the etched roll;

drying temperature=90° C. for all the ovens (primer and PVDC).

The crystallinity, water vapour transmission rate and flexibility were measured as described previously. The results obtained are described in Table 1.

EXAMPLE 4 (COMPARATIVE)

Polymerization of VDC in Aqueous Emulsion in the Absence of the PMMA Seed Latex Prepared in Example 1

Example 2 was reproduced in the absence of the PMMA seed latex prepared in Example 1. The total amount of demineralized water in the polymerization formula was kept constant to obtain a solids content comparable to that from Example 2. The polymerization lime was 14 hours and 20 minutes.

EXAMPLE 5 (COMPARATIVE)

Properties of the PVDC Latex Obtained in Example 4

The properties of the PVDC latex obtained in Example 2 were measured in the manner described previously. The results are given in Table 1.

The crystallinity, water vapour transmission rate and flexibility were measured as described previously. The results obtained are described in Table 1.

EXAMPLE 6 (COMPARATIVE)

Polymerization of VDC in Aqueous Emulsion in the Presence of the PMMA Seed Latex Prepared in Example 1

Example 2 was reproduced except that the autoclave was charged with 1969 g (32 g of dry matter/kg of monomers) of the PMMA seed latex prepared in Example 1. The total amount of demineralized water in the polymerization formula was kept constant to obtain a solids content comparable to that from Example 2. The polymerization time was 9 hours and 45 minutes.

EXAMPLE 7 (COMPARATIVE)

Properties of the PVDC Latex Obtained in Example 6

The properties of the PVDC latex obtained in Example 6 were measured in the manner described previously. The results are given in Table 2.

Although the latex had a normal appearance, difficulties were encountered during the coating operation (clogging of the filters). Only one layer was able to be coated and the film obtained exhibited a lot of microcracks. The coating operation was therefore stopped (and it was not possible to measure the properties of the film as had been done for the other examples).

EXAMPLE 8 (COMPARATIVE)

Preparation of a PMMA Seed Latex

Example 1 was reproduced except that the polymerization was carried out in a 40 l autoclave equipped with a cooling circuit and with the following modifications to the formula: the polymerization autoclave was successively charged with 19.244 l of demineralized water, 480 ml (10 g of active material/kg of monomer) of a sodium dodecylbenzenesulphonate solution containing 25% of active material (DISPONIL LDBS 25 supplied by Cognis) and 1.2 kg (100 g of active material/kg of monomer) of methyl methacrylate.

The autoclave was closed then subjected to two vacuum operations at 120 mbar absolute pressure. Next the stirrer for the reaction medium was started at 100 rpm while raising the temperature of the mixture to 85° C. When the temperature reached 84° C. (=$T_o$), 1149 ml (6.7 g of active material/kg of monomer) of a 70 g/l ammonium persulphate solution was added in one go.

At $T_o$+30 min, the following were added at a constant rate and over 3 hours: 15.9 kg of the emulsified mixture composed of the following constituents: 3.9 kg of demineralized water, 1.2 kg (25 g of active material/kg of monomer) of a 250 g/l DISPONIL LDBS 25 solution and 10.8 kg (900 g of active material/kg of monomer) of methyl methacrylate. At $T_o$+32 min, 480 ml (2.8 g of active material/kg of monomer) of a 70 g/l ammonium persulphate solution were added at a constant rate and over 3 hours.

The polymerization was controlled at 85° C. After the end of the injections of methyl methacrylate emulsion and ammonium persulphate solution, the polymerization was continued until a temperature difference of less than 2° C. was obtained between the temperature of the reaction medium and that of the cooling circuit, followed by a post-polymerization of one hour. Next, the latex was hot-degassed then stripped under vacuum at 65° C. for 3 hours.

The solids content of the PMMA seed latex thus polymerized was 30.7%. The average diameter of the particles, determined by hydrodynamic fractionation as described above, was 63 nm. The particle diameter distribution was monomodal with a standard deviation of 10 nm.

EXAMPLE 9 (COMPARATIVE)

Polymerization of VDC in Aqueous Emulsion in the Presence of the PMMA Seed Latex Prepared in Example 8

Example 2 was reproduced except that the autoclave was charged with 521 g (8 g of dry matter/kg of monomers) of the PMMA seed latex prepared in Example 8. In this example the polymerization reaction was started more slowly than in Example 2. An additional dose of sodium metabisulphite, identical to that added initially, then an additional dose of ammonium persulphate, identical to that added initially, were added after polymerizing for 195 minutes. The total amount of demineralized water in the polymerization formula was kept constant to obtain a solids content comparable to that from Example 2. The polymerization time was 14 hours and 9 minutes.

EXAMPLE 10 (COMPARATIVE)

Properties of the PVDC Latex Obtained in Example 9

The properties of the PVDC latex obtained in Example 9 were measured in the manner described previously. The results are given in Table 2.

Although the latex obtained was characterized by a greyish colour and the presence of sludges and coagulates, the coating operation was started. However, it had to be stopped because the film obtained had too many microcracks (and it was not possible to measure the properties thereof as had been done for the other examples).

EXAMPLE 11 (COMPARATIVE)

Preparation of a PMMA Seed Latex

Example 1 was reproduced except that the polymerization was carried out in a 40 l autoclave equipped with a cooling circuit and with the following modifications to the formula: the polymerization autoclave was successively charged with 19.514 l of demineralized water, 120 ml (2.5 g of active material/kg of monomer) of a sodium dodecylbenzenesulphonate solution containing 25% of active material (DISPONIL LDBS 25 supplied by Cognis) and 1.2 kg (100 g of active material/kg of monomer) of methyl methacrylate.

The autoclave was closed then subjected to two vacuum operations at 120 mbar absolute pressure. Next the stirrer for the reaction medium was started at 100 rpm while raising the temperature of the mixture to 85° C. When the temperature reached 84° C. (=$T_o$), 1149 ml (6.7 g of active material/kg of monomer) of a 70 g/l ammonium persulphate solution were added in one go.

At $T_o$+30 min, the following were added at a constant rate and over 3 hours: 15.9 kg of the emulsified mixture composed of the following constituents: 3.9 kg of demineralized water, 1.2 kg (25 g of active material/kg of monomer) of a 250 g/l DISPONIL LDBS 25 solution and 10.8 kg (900 g of active material/kg of monomer) of methyl methacrylate. At $T_o$+32 min, 480 ml (2.8 g of active material/kg of monomer) of a 70 g/l ammonium persulphate solution were added at a constant rate and over 3 hours.

The polymerization was controlled at 85° C. After the end of the injections of methyl methacrylate emulsion and ammonium persulphate solution, the polymerization was continued until a temperature difference of less than 2° C. was obtained between the temperature of the reaction medium and that of the cooling circuit, followed by a post-polymerization of one hour. Next, the latex was hot-degassed then stripped under vacuum at 65° C. for 3 hours.

The solids content of the PMMA seed latex thus polymerized was 32.3%. The average diameter of the particles, determined by hydrodynamic fractionation as described above, was 93 nm. The particle diameter distribution was monomodal with a standard deviation of 8 nm.

EXAMPLE 12 (COMPARATIVE)

Polymerization of VDC in Aqueous Emulsion in the Presence of the PMMA Seed Latex Prepared in Example 11

Example 2 was reproduced except that the autoclave was charged with 495 g (8 g of dry matter/kg of monomers) of the PMMA seed latex prepared in Example 11. The total amount of demineralized water in the polymerization formula was kept constant to obtain a solids content comparable to that from Example 2. The polymerization time was 16 hours and 35 minutes.

EXAMPLE 13 (COMPARATIVE)

Properties of the PVDC Latex Obtained in Example 12

The properties of the PVDC latex obtained in Example 12 were measured in the manner described previously. The results are given in Table 2.

Although the latex obtained was characterized by a greyish colour, the coating operation was started. However, it had to be stopped because the film had too many microcracks (and it was not possible to measure the properties thereof as had been done for the other examples).

EXAMPLE 14 (COMPARATIVE)

Polymerization of VDC in Aqueous Emulsion in the Presence of the PMMA Seed Latex Prepared in Example 11

Example 2 was reproduced except that the autoclave was charged with 1981 g (32 g of dry matter/kg of monomers) of the PMMA seed latex prepared in Example 11. The total amount of demineralized water in the polymerization formula was kept constant to obtain a solids content comparable to that from Example 2. The polymerization time was 19 hours and 7 minutes.

EXAMPLE 15 (COMPARATIVE)

Properties of the PVDC Latex Obtained in Example 14

The properties of the PVDC latex obtained in Example 14 were measured in the manner described previously. The results are given in Table 2.

The latex obtained was characterized by the presence of a lot of sludges and coagulates. The coating operation could not be carried out.

EXAMPLE 16 (ACCORDING TO THE INVENTION)

Preparation of a PMMA Seed Latex

Example 1 was reproduced except that the polymerization was carried out in a 40 l autoclave equipped with a cooling circuit and with the following modifications to the formula: the polymerization autoclave was successively charged with 16.724 l of demineralized water, 3840 ml (80 g of active material/kg of monomer) of a sodium dodecylbenzene-sulphonate solution containing 25% of active material (DISPONIL LDBS 25 supplied by Cognis) and 1149 ml (6.7 g of active material/kg of monomer) of a 70 g/l ammonium persulphate solution.

The autoclave was closed then subjected to two vacuum operations at 120 mbar absolute pressure. Next the stirrer for the reaction medium was started at 100 rpm while raising the temperature of the mixture to 85° C. When the temperature reached 84° C., the temperature $T_o$ was reached. At $T_o+1$ min. the following were added at a constant rate and over 3 hours: 17.04 kg of the emulsified mixture composed of the following constituents: 4.08 kg of demineralized water, 0.96 kg (20 g of active material/kg of monomer) of a 250 g/l solution of DISPONIL LDBS 25 and 12 kg (all the monomer) of methyl methacrylate. At $T_o+2$ min, 492 ml (2.87 g of active material/kg of monomer) of a 70 g/l ammonium persulphate solution were added at a constant rate and over 3 hours.

The polymerization was controlled at 85° C. After the end of the injections of methyl methacrylate emulsion and ammonium persulphate solution, the polymerization was continued until a temperature difference of less than 2° C. was obtained between the temperature of the reaction medium and that of the cooling circuit, followed by a post-polymerization of one hour. Next, the latex was hot-degassed then stripped under vacuum at 65° C. for 3 hours.

The solids content of the PMMA seed latex thus polymerized was 34.3%. The average diameter of the particles, determined by hydrodynamic fractionation as described above, was 35 nm. The particle diameter distribution was monomodal with a standard deviation of 7 nm.

EXAMPLE 17 (ACCORDING TO THE INVENTION)

Preparation of a PMMA Seed Latex

Example 1 was reproduced except that the polymerization was carried out in a 40 l autoclave equipped with a cooling circuit and with the following modifications to the formula: the polymerization autoclave was successively charged with 20.804 l of demineralized water, 4800 ml (100 g of active material/kg of monomer) of a sodium dodecylbenzene-sulphonate solution containing 25% of active material (DISPONIL LDBS 25 supplied by Cognis) and 1.2 kg (100 g of active material/kg of monomer) of methyl methacrylate.

The autoclave was closed then subjected to two vacuum operations at 120 mbar absolute pressure. Next the stirrer for the reaction medium was started at 100 rpm while raising the temperature of the mixture to 85° C. When the temperature reached 84° C. (=$T_o$), 1149 ml (6.7 g of active material/kg of monomer) of a 70 g/l ammonium persulphate solution were added in one go.

At $T_o+1$ min, the following were added at a constant rate and over 3 hours: 10.8 kg (900 g of active material/kg of monomer) of methyl methacrylate. At $T_o+2$ min, 492 ml (2.87 g of active material/kg of monomer) of a 70 g/l ammonium persulphate solution were added at a constant rate and over 3 hours.

The polymerization was controlled at 85° C. After the end of the injections of methyl methacrylate emulsion and ammonium persulphate solution, the polymerization was continued until a temperature difference of less than 2° C. was obtained between the temperature of the reaction medium and that of the cooling circuit, followed by a post-polymerization of one hour. Next, the latex was hot-degassed then stripped under vacuum at 65° C. for 3 hours.

The solids content of the PMMA seed latex thus polymerized was 34.6%. The diameter of the particles, determined by hydrodynamic fractionation as described above, was 34 nm. The particle diameter distribution was monomodal with a standard deviation of 10 nm.

EXAMPLE 18 (COMPARATIVE)

Preparation of a PMMA Seed Latex

Example 1 was reproduced except that the polymerization was carried out in a 40 l autoclave equipped with a cooling circuit and with the following modifications to the formula: the polymerization autoclave was successively charged with 18.884 l of demineralized water, 960 ml (20 g of active material/kg of monomer) of a sodium dodecylbenzene-sulphonate solution containing 25% of active material (DISPONIL LDBS 25 supplied by Cognis) and 1.2 kg (100 g of active material/kg of monomer) of methyl methacrylate.

The autoclave was closed then subjected to two vacuum operations at 120 mbar absolute pressure. Next the stirrer for the reaction medium was started at 100 rpm while raising the temperature of the mixture to 85° C. When the temperature reached 84° C. (=$T_o$), 1149 ml (6.7 g of active material/kg of monomer) of a 70 g/l ammonium persulphate solution were added in one go.

At $T_o+10$ min, the following were added at a constant rate and over 3 hours: 16.2 kg of the emulsified mixture composed of the following constituents: 3.0 kg of demineralized water, 2.4 kg (50 g of active material/kg of monomer) of a 250 g/l DISPONIL LDBS 25 solution and 10.8 kg (900 g of active material/kg of monomer) of methyl methacrylate. At $T_o+15$ min, 492 ml (2.87 g of active material/kg of monomer) of a 70 g/l ammonium persulphate solution were added at a constant rate and over 3 hours.

The polymerization was controlled at 85° C. After the end of the injections of methyl methacrylate emulsion and ammonium persulphate solution, the polymerization was continued until a temperature difference of less than 2° C. was obtained between the temperature of the reaction medium and that of the cooling circuit, followed by a post-polymerization of one hour. Next, the latex was hot-degassed then stripped under vacuum at 65° C. for 3 hours.

The solids content of the PMMA seed latex thus polymerized was 33.6%. The average diameter of the particles, determined by hydrodynamic fractionation as described above, was 50 nm. The particle diameter distribution, although of monomodal appearance, was not symmetrical but very assymmetrical and very spread out with particles of which the diameter varied from 5 nm to 160 nm. The standard deviation was 24 nm.

EXAMPLE 19 (COMPARATIVE)

Preparation of a PMMA Seed Latex

Example 1 was reproduced except that the polymerization was carried out in a 40 l autoclave equipped with a cooling circuit and with the following modifications to the formula: the polymerization autoclave was successively charged with 19.586 l of demineralized water, 24 ml (0.5 g of active material/kg of monomer) of a sodium dodecylbenzenesulphonate solution containing 25% of active material (DISPONIL LDBS 25 supplied by Cognis) and 1.2 kg (100 g of active material/kg of monomer) of methyl methacrylate.

The autoclave was closed then subjected to two vacuum operations at 120 mbar absolute pressure. Next the stirrer for the reaction medium was started at 100 rpm while raising the temperature of the mixture to 85° C. When the temperature reached 84° C. (=$T_o$), 1149 ml (6.7 g of active material/kg of monomer) of a 70 g/l ammonium persulphate solution was added in one go.

At $T_o$+30 min, the following were added at a constant rate and over 3 hours: 15.9 kg of the emulsified mixture composed of the following constituents: 3.9 kg of demineralized water, 1.2 kg (25 g of active material/kg of monomer) of a 250 g/l DISPONIL LDBS 25 solution and 10.8 kg (900 g of active material/kg of monomer) of methyl methacrylate. At $T_o$+32 min, 480 ml (2.8 g of active material/kg of monomer) of a 70 g/l ammonium persulphate solution were added at a constant rate and over 3 hours.

The polymerization was controlled at 85° C. After the end of the injections of methyl methacrylate emulsion and ammonium persulphate solution, the polymerization was continued until a temperature difference of less than 2° C. was obtained between the temperature of the reaction medium and that of the cooling circuit, followed by a post-polymerization of one hour. Next, the latex was hot-degassed then stripped under vacuum at 65° C. for 3 hours.

The solids content of the PMMA seed latex thus polymerized was 32.5%. The particle diameter distribution was bimodal with a first family of particles of which the average diameter was 44 nm and a second family of particles of which the average diameter was 188 nm.

TABLE I

|  | Example 3 (according to the invention) | Example 5 (comparative) |
|---|---|---|
| Polymerization time | 12 h 0 min | 14 h 20 min |
| Particle diameter | 154 nm | 154 nm |
| Distribution | monomodal | monomodal |
| Standard deviation | 12 nm | 25 nm |
| Crust | 80 g | 500 g |
| Lumps | 100 g | 500 g |
| Thermal stability of the additivated latex | 19 days | 17 days |
| Crystallinity after coating | 0.98 | 0.99 |
| Crystallinity after 1 day at 30° C. | 1.05 | 1.17 |
| Crystallinity after 1 week at 23° C. | 1.03 | 1.13 |
| Water vapour transmission rate after treatment for 2 days at 40° C., measured at 38° C. and 90% relative humidity | 20 g · µm/m$^2$ · d | 20 g · µm/m$^2$ · d |
| Flexibility after treatment for 1 day at 30° C. and 50% relative humidity | >90 cm ductile fracture | 30 cm brittle fracture |

From analysis of Table 1, it appears that the process according to the invention makes it possible to prepare PVDC latices that are characterized by an improved productivity (reduced polymerization time, reduced amount of crust and lumps) while retaining an identical average particle diameter and a comparable thermal stability and that give rise to the production of films that are characterized by a lower crystallization rate resulting in a better flexibility than those prepared by a process according to the prior art. Furthermore, the films are characterized by a water vapour barrier that is suitable for the desired applications. It may also be observed that the distribution of the average particle diameters is characterized by a smaller standard deviation for the PVDC latex according to the invention (Example 3) than that measured for the latex according to the prior art (Example 5).

TABLE 2

|  | Example 3 (according to the invention) | Example 7 (comparative) | Example 10 (comparative) | Example 13 (comparative) | Example 15 (comparative) |
|---|---|---|---|---|---|
| Polymerization time | 12 h 0 min | 9 h 45 min | 14 h 09 min | 16 h 35 min | 19 h 07 min |
| Particle diameter | 154 nm | 99 nm | 93 nm and 208 nm | 123 nm and 342 nm | 91 nm and 234 nm |
| Standard deviation | 12 nm | 15 nm | / | / | / |
| Coefficient of variation | 7.79% | 15% | / | / | / |
| Distribution | monomodal | monomodal | bimodal | bimodal | bimodal |
| Crust | 80 g | 450 g | 300 g | 200 g | 700 g |
| Lumps | 100 g | 50 g | / | 100 g | 200 g |
| Thermal stability | 19 days | 15 days | 12 days | 14 days | 9 days |
| Coating operation | Achievable | Not achievable | Not achievable | Not achievable | Not achievable |

From analysis of Table 2, it appears that the process according to the invention is characterized by an improved productivity when the three parameters polymerization time, amount of crust and amount of lumps are taken into account.

While the PVDC latex obtained by the process according to the invention described in Example 3 according to the invention is characterized by a monomodal distribution of the particle diameters and an average diameter of these particles of 154 nm, the PVDC latices obtained by the processes described in the Comparative Examples 7, 10, 13 and 15 are characterized by a smaller average particle diameter and, for the last three, by a bimodal distribution of the particle diameters.

In terms of thermal stability, it appears that this is lower for the latices obtained by the processes described in the comparative examples, in particular in the Comparative Examples 10, 13 and 15, compared to that measured for the latex obtained by the process described in Example 3.

Finally, while films were able to be produced, and then analysed, from the latex obtained in Example 3, difficulties were encountered during the coating operation for the latices obtained by the processes described in the comparative examples: presence of sludges and coagulates, clogging of the filters and/or films exhibiting microcracks.

The invention claimed is:

1. A process for preparing a chlorinated vinyl polymer latex, the process comprising:
   radically polymerizing at least one chlorinated vinyl monomer in an aqueous emulsion in the presence of a methyl methacrylate polymer seed latex,
   wherein the polymerizing takes place in the presence of at most 3% by weight, expressed relative to a total weight of monomers, of dry matter of said methyl methacrylate polymer seed latex,
   wherein particles of the methyl methacrylate polymer seed latex have an average diameter, measured by hydrodynamic fractionation, less than or equal to 60 nm, and
   wherein a particle diameter distribution of the particles, determined by hydrodynamic fractionation, is monomodal and has a standard deviation less than or equal to 20 nm.

2. The process of claim 1, wherein the polymerizing takes place in the presence of at most 1.5% by weight, expressed relative to the total weight of the monomers, of dry matter of the methyl methacrylate polymer seed latex.

3. The process of claim 1, wherein a chlorinated vinyl polymer of the chlorinated vinyl polymer latex is a vinylidene chloride polymer.

4. The process of claim 1, wherein the vinylidene chloride polymer is a copolymer of vinylidene chloride and at least one monomer selected from the group consisting of maleic anhydride, itaconic acid, methyl acrylate, methyl methacrylate, ethyl acrylate, ethyl methacrylate, n-butyl acrylate, n-butyl methacrylate, 2-ethylhexyl acrylate, 2-ethylhexyl methacrylate, 2-hydroxyethyl acrylate, 2-hydroxyethyl methacrylate, glycidyl methacrylate, glycidyl acrylate, acrylonitrile, methacrylonitrile, acrylic acid, methacrylic acid, acrylamide, N-methylolacrylamide, 2-acrylamido-2-methylpropanesulphonic acid (AMPS) a salt of 2-acrylamido-2-methylpropanesulphonic acid, 2-sulphoethylmethacrylic acid (2-SEM) a salt of 2-sulphoethylmethacrylic acid, a phosphate ester of methacrylate-terminated polypropylene glycol salts, and a salt of a phosphate ester of methacrylate-terminated polypropylene glycol.

5. The process of claim 1, wherein the particles of the methyl methacrylate polymer seed latex have an average diameter, measured by hydrodynamic fractionation, less than or equal to 40 nm.

6. The process of claim 1, wherein the particles of the methyl methacrylate polymer seed latex have a monomodal particle diameter distribution, determined by hydrodynamic fractionation, with a standard deviation less than or equal to 10 nm.

7. The process of claim 1, wherein the particles of the chlorinated vinyl polymer latex have an average diameter, measured by hydrodynamic fractionation, greater than or equal to 120 nm.

8. The process of claim 1, wherein the particles of the chlorinated vinyl polymer latex have an average diameter, measured by hydrodynamic fractionation, of at most 200 nm.

9. The process of claim 1, wherein the particles of the chlorinated vinyl polymer latex have a monomodal particle diameter distribution, determined by hydrodynamic fractionation.

10. The process of claim 1, wherein the vinylidene chloride polymer comprises from 50 to 95% by weight of vinylidene chloride.

* * * * *